Patented June 3, 1952

2,599,203

UNITED STATES PATENT OFFICE 2,599,203

PREPARATION OF ALUMINUM BOROHYDRIDE

Hermann I. Schlesinger, Chicago, Ill., and Herbert C. Brown, Detroit, Mich., assignors to the United States of America as represented by the United States Atomic Energy Commission No Drawing. Application March 22, 1946, Serial No. 656,502

9 Claims. (Cl. 23—14)

This application relates to a method of preparing aluminum borohydride, $Al(BH_4)_3$.

It is an object of the present invention to provide an improved method of producing aluminum borohydride. It is a further object of the present invention to provide a convenient and efficient method of preparing aluminum borohydride on a large scale.

It is a more specific object of the present invention to provide a process in which an alkali metal borohydride and an aluminum halide are reacted to form aluminum borohydride.

Further objects and advantages will appear from the following description.

Aluminum borohydride has been previously prepared by repeated treatment of trimethyl aluminum with excess diborane until all the methyl groups have been removed. See Schlesinger, Sanderson and Burg, Journal of the American Chemical Society, vol. 62, page 3425 (1940). In the hands of a skilled operator and for small quantities used in ordinary research activities, the method is entirely satisfactory. However, it is quite impractical as a large scale process.

In accordance with the present invention it has been found that aluminum borohydride may be obtained by the reaction of an alkali metal borohydride with an aluminum halide. The reaction between the alkali metal borohydride and the aluminum halide probably proceeds in accordance with the following equation:

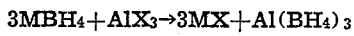

where M is an alkali metal and X is a halide.

The alkali metal borohydride and the aluminum halide are placed in a reaction vessel and intimately mixed with each other in the absence of air. The reaction is suitably effected at temperatures of about 50° C. to about 100° C., and the volatile aluminum borohydride distills from the mixture.

It is necessary to carry out the reaction between the alkali metal hydride and aluminum halide in the absence of air, preferably in an inert atmosphere such as a nitrogen atmosphere, since the mixture is spontaneously inflammable in air. Before introducing the reactants the reactor should be flushed with nitrogen or similar inert gas to remove air from the system.

The process of the present invention is illustrated by the following specific example in which all parts are by weight.

Example

A reaction chamber was evacuated to a pressure of less than $10^{-4}$ mm. of mercury. Purified nitrogen was introduced and flowed through the apparatus to make sure all air was removed. Eleven parts (0.5 mol.) of lithium borohydride was carefully introduced into the tube so as to avoid getting air into the apparatus. The reaction chamber was then slowly evacuated so as to avoid scattering the light lithium borohydride powder. Nitrogen was again introduced into the apparatus and 28 parts (0.21 mol.) of anhydrous aluminum chloride was added as rapidly as possible without introducing air into the apparatus. The nitrogen was again pumped out, this time through a cold trap maintained at —196° C. by liquid nitrogen in order to recover any aluminum borohydride which may have already formed. The reaction chamber was then disconnected from the vacuum pump. The solid powders were thoroughly mixed by vigorous shaking. The reaction chamber was again connected to the vacuum pump and pumped out through a liquid nitrogen trap (—196° C.). After 2 hours a bath at 60 to 70° C. was placed around the tube. After another 2 hours a bath at about 90° C. was placed around the tube.

The combined distillates from these operations collected in the liquid nitrogen trap were purified from small quantities of diborane by distilling through a trap at —80° C. At this temperature diborane will not condense while the aluminum borohydride product does condense.

Purification from small quantities of impurities of lower volatility pure aluminum borohydride was effected by raising the temperature of the —80° C. trap to —60° C. and slowly distilling the aluminum borohydride away from the less volatile impurities. The product is collected in a liquid nitrogen trap.

The final product yield is 11.9 parts equivalent to 94% of the theoretical yield. In the process of the above example the reaction proceeded according to the following equation:

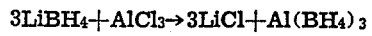

The aluminum borohydride is quite volatile having a vapor pressure of 119.5 mm. mercury at 0° C. and an extrapolated boiling point of 44.5° C. Its melting point is —64.5° C.

The preferred alkali metal borohydride to be used in this process is lithium borohydride. However, sodium borohydride and potassium borohydride and the other alkali metal borohydrides may also be used. When sodium borohydride or potassium borohydride is used a somewhat higher reaction temperature of about 100° C. is desirable. The preferred aluminum halides are the chloride and bromide, and particularly the former.

The above detailed description is given for purposes of illustration and specific details thereof are not intended to limit the scope of the invention which is to be limited only by the scope of the following claims.

What is claimed is:

1. A process of preparing aluminum borohydride which comprises reacting an alkali metal borohydride with an aluminum halide to form aluminum borohydride.

2. A process of preparing aluminum borohydride which comprises reacting an alkali metal borohydride with an aluminum halide in an inert atmosphere to form aluminum borohydride.

3. A process of preparing aluminum borohydride that comprises reacting lithium borohydride with anhydrous aluminum chloride to form aluminum borohydride.

4. A process of preparing aluminum borohydride that comprises reacting lithium borohydride with anhydrous aluminum chloride by heating the mixture of reactants first to about 60° C. then to about 90° C. in an inert atmosphere to form a product containing aluminum borohydride, distilling the product and recovering aluminum borohydride.

5. A process of preparing aluminum borohydride that comprises reacting lithium borohydride with anhydrous aluminum bromide to form aluminum borohydride.

6. A process of preparing aluminum borohydride that comprises reacting sodium borohydride with anhydrous aluminum chloride to form aluminum borohydride.

7. A process of preparing aluminum borohydride that comprises reacting sodium borohydride with anhydrous aluminum bromide to form aluminum borohydride.

8. A process of preparing aluminum borohydride that comprises reacting sodium borohydride with anhydrous aluminum chloride carrying out the reaction in an inert atmosphere to form aluminum borohydride and distilling aluminum borohydride from the reaction mass.

9. A process of preparing aluminum borohydride that comprises reacting sodium borohydride with anhydrous aluminum chloride by heating the mixture of reactants first to about 60° C. then to about 100° C. in an inert atmosphere to form a product containing aluminum borohydride, distilling the product and recovering aluminum borohydride.

HERMANN I. SCHLESINGER.
HERBERT C. BROWN.

No references cited.